(12) United States Patent
Long et al.

(10) Patent No.: US 7,378,452 B2
(45) Date of Patent: May 27, 2008

(54) FILTRATION SYSTEM FOR SLURRY HYDROCARBON SYNTHESIS PROCESS USING BOTH SMALL AND LARGE PORE FILTER ELEMENTS

(75) Inventors: David C. Long, Ashburn, VA (US); Thomas M. Holden, Baton Rouge, LA (US); Stephen J. Hsia, Baton Rouge, LA (US); Costas A. Coulaloglou, Alexandria, VA (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 11/641,222

(22) Filed: Dec. 19, 2006

(65) Prior Publication Data

US 2007/0161715 A1    Jul. 12, 2007

Related U.S. Application Data

(60) Provisional application No. 60/754,469, filed on Dec. 28, 2005.

(51) Int. Cl.
    C07C 27/00    (2006.01)
(52) U.S. Cl. .................................................. 518/700
(58) Field of Classification Search ................. 518/700
    See application file for complete search history.

(56) References Cited

U.S. PATENT DOCUMENTS

| | | | |
|---|---|---|---|
| 5,422,375 A | 6/1995 | Rytter et al. | |
| 5,520,890 A | 5/1996 | Lorentzen et al. | |
| 5,527,473 A | 6/1996 | Ackerman | |
| 5,770,629 A | 6/1998 | Degeorge et al. | |
| 5,811,469 A | 9/1998 | Leviness et al. | |
| 5,900,159 A | 5/1999 | Engel et al. | |
| 6,344,490 B1 * | 2/2002 | DeGeorge et al. | .......... 518/700 |
| 6,462,098 B1 | 10/2002 | Vogel et al. | |
| 6,762,209 B1 | 7/2004 | Neathery et al. | |
| 6,777,451 B2 | 8/2004 | Koveal et al. | |
| 6,800,579 B2 | 10/2004 | Daage et al. | |
| 6,833,078 B2 | 12/2004 | Espinoza et al. | |
| 2003/0232894 A1 | 12/2003 | Mohedas et al. | |

(Continued)

FOREIGN PATENT DOCUMENTS

DE    3245318 C3    6/1984

(Continued)

*Primary Examiner*—J. Parsa
(74) *Attorney, Agent, or Firm*—Joseph J. Dvorak

(57) ABSTRACT

A method for separating and filtering solid particles from a hydrocarbon slurry liquid includes two or more filter sections in fluid communication with the hydrocarbon slurry. At least one filter section is comprised of one or more filter elements having a mean pore size of less than 10 microns, and at least one other section is comprised of one or more filter elements having a mean pore size of 10 microns or greater. The small pore filter (less than 10 microns) will exclude all or substantially all of the smaller catalyst fines produced by catalyst particle attrition. The liquid product removed from the small pore filters will be substantially free of particulates. The large pore filters (10 microns or greater) will exclude larger catalyst particles, but will allow the smaller fines to pass. The liquid product removed from the large pore filters will contain the fines generated from catalyst particle attrition.

14 Claims, 1 Drawing Sheet

U.S. PATENT DOCUMENTS

| | | |
|---|---|---|
| 2004/0132835 A1 | 7/2004 | Gamlin et al. |
| 2004/0235966 A1 | 11/2004 | Bhatt et al. |
| 2005/0000861 A1 | 1/2005 | Clerici et al. |
| 2005/0004238 A1 | 1/2005 | Clerici et al. |

FOREIGN PATENT DOCUMENTS

| | | |
|---|---|---|
| EP | 0238107 B1 | 4/1990 |
| WO | WO 00/43098 | 7/2000 |
| WO | WO 03/089102 A2 | 4/2003 |
| WO | WO 03/089103 A2 | 10/2003 |
| WO | WO 2005/005038 A1 | 1/2005 |

\* cited by examiner

FILTRATION SYSTEM FOR SLURRY HYDROCARBON SYNTHESIS PROCESS USING BOTH SMALL AND LARGE PORE FILTER ELEMENTS

This application is a Non-Provisional Application based on Provisional Application No. 60/754,469 filed Dec. 28, 2005.

FIELD OF THE INVENTION

This invention relates to a filter system useful for separating liquid from solid particles. More particularly, this invention comprises one or more large pore filter elements and one or more small pore filter elements. The large pore and small pore elements are manifolded into separate sections, allowing independent withdrawal of material from either section. The proposed filter system is useful for separating liquid hydrocarbon product from a Fischer-Tropsch hydrocarbon synthesis slurry comprising catalyst particles in a hydrocarbon liquid product.

BACKGROUND OF THE INVENTION

Slurry hydrocarbon synthesis (HCS) processes are known. In a slurry HCS process a synthesis gas (syngas) containing a mixture of $H_2$ and CO is bubbled upward through a slurry in a reactor comprised of hydrocarbon reaction products having dispersed therein a Fischer-Tropsch type hydrocarbon synthesis catalyst. Reactors that contain such a three phase slurry are sometimes referred to as "bubble columns", as is disclosed in U.S. Pat. No. 5,348,982, which is incorporated herein by reference. Irrespective of whether the slurry reactor is operated as a dispersed or slumped bed, the mixing conditions in the slurry will typically be somewhere between the two theoretical conditions of plug flow and back mixed. The catalyst particles are typically kept dispersed and suspended in the liquid by the lifting action of the syngas bubbling up through the slurry and by hydraulic means. Slurry Fischer-Tropsch reactors produce a vapor phase and a higher molecular weight liquid product stream.

Because of the formation of liquid products (commonly called waxes in this context), it is necessary to maintain the slurry at a constant level by continuously or intermittently removing liquid products from the reactor. One problem with the removal of liquids, however, is that catalyst particles are dispersed in the liquid and must be separated from the said liquid and returned to the reactor slurry in order to maintain a constant inventory of catalyst in the reactor. Several means have been proposed for separating the catalyst from the liquid products, e.g., centrifuges, sintered metal filters, cross-flow filters, magnetic separators, gravitational settling, etc.

Filtration is one of the catalyst-liquid separation methods used with Fischer-Tropsch reactors. Filtration techniques are characterized by solid-liquid separation systems that remove liquid products from a slurry by drawing the fluid across a filter medium. The filter medium may be simply a filter substrate or may be composed of a filter cake disposed on a filter substrate, such that the filter cake forms a primary filter. A filter cake is formed as solid particles are deposited on the filter substrate creating a permeable barrier between the slurry and the substrate. The thickness and permeability of the filter cake is critical to the efficient operation of the filtration system.

In a commercial slurry bubble column reactor, the hydrodynamic conditions inside the reactor, coupled with the desired long lifetime of the catalytic material, typically results in catalyst attrition. As the catalyst breaks down over time, sub-particles of various sizes are created, including very small particles known as "fines", some of which may even be sub-micron in size. The presence of fines in the reactor tends to greatly reduce the effectiveness of the catalyst-liquid separation system.

In a slurry reactor, the action of the gas rising through the liquid and solid phases results in agitation and movement of those phases. This agitation has a beneficial effect on the performance of filters that may be immersed in the slurry reactor. The agitation of the slurry generally significantly reduces the accumulation of solids on the surface of the filter due to the drag force of the agitated liquid on the solids at the filter surface. It is known that this drag force is a function of the particle size, with smaller particles experiencing less drag than larger particles. Hence, while it may be possible to operate a filter in a slurry bubble column with large catalyst particles for extended times, finer particles are more easily collected on the filter surface and can contribute to fouling of that filter. Thus, in a catalyst-liquid separation system utilizing filtration, cycle time between backwashing operations, as well as filter life, may be greatly reduced because the fines tend to reduce the permeability and flux of the filter system. The use of centrifuges or gravitational settlers is not practical for removing fines from the catalyst slurry because the fine particles are low in concentration relative to the catalyst. Magnetic separation is similarly impractical for removing fines from the slurry. Thus the performance of catalyst-liquid separation systems has heretofore been undesirably dependent upon the age of the catalyst. For example, when the catalyst is new the catalyst-liquid separation system operates at a very high rate, but the rate substantially decreases as the catalyst ages and attrition causes fines concentration to increase.

It is also undesirable to have particulates present in the liquid product from the HCS reactor. The products from an HCS reactor may be subject to additional processing in systems downstream of the HCS reactor that may have stringent specifications on the concentration of particulates. In addition, final products, e.g., lube oils or diesel, may also have stringent specifications on particulates content.

Thus, there remains a need in the art for methods and apparatus to maintain the effectiveness of a catalyst-liquid separation system independent of the age or degree of attrition of the catalyst. Therefore, the embodiments of the present invention are directed to methods and apparatus for removing catalyst fines from a slurry that seek to overcome the limitations of the prior art.

SUMMARY OF THE INVENTION

In accordance with the present invention there is provided a slurry hydrocarbon synthesis process for forming hydrocarbons, at least a portion of which are liquid, the invention comprises:

(a) reacting a synthesis gas containing a mixture of $H_2$ and CO in the presence of a solid, particulate hydrocarbon synthesis catalyst in a slurry in a hydrocarbon synthesis reactor at reaction conditions effective to form hydrocarbons, at least a portion of which are liquid at said reaction conditions, wherein said slurry comprises said catalyst and gas bubbles in a hydrocarbon slurry liquid, and wherein said slurry hydrocarbon liquid comprises said liquid hydrocarbons;

(b) contacting said slurry with a filter system comprised of one or more filter elements having pores of less than about 10 microns, and one or more filter elements having pores 10 microns or greater; said small pore filter elements arrayed across a manifold connected to a filtrate conduit, with the interior of the elements, manifold and conduit in fluid communication with each other, and wherein the wall separating the interior of the elements from the slurry is permeable to said slurry hydrocarbon liquid but not said slurry solids; and said large pore filter elements arrayed across a separate manifold connected to a separate filtrate conduit, with the interior of the elements, manifold and conduit in fluid communication with each other, and wherein the wall separating the interior of the elements from the slurry is permeable to said slurry hydrocarbon liquid and particles less than about 10 microns, and wherein said larger pore filter elements are such that no more than about 25 wt % of slurry liquid is passed there-through;

(c) passing said slurry hydrocarbon liquid through said small pore filter element walls and into said interior of said elements as a filtrate and then successively passing said filtrate through the interior of said manifold and said filtrate conduit and passing said filtrate from said conduit out of said reactor; and (d) passing said slurry hydrocarbon liquid and fines through said large pore filter element walls and into said interior of said elements as a filtrate and then successively passing said filtrate through the interior of said manifold and said filtrate conduit passing said filtrate from said conduit out of said reactor.

Thus, one of the advantages of the present invention is that the liquid product removed from the reactor through the small pore filter element is substantially free of solids and fines, while the concentration of fines in the reactor is controlled using the large pore filter element.

BRIEF DESCRIPTION OF THE DRAWING

The sole FIGURE hereof is simplified schematic of a preferred embodiment of large and small filter assemblies of the present invention immersed in the slurry liquid in a slurry reactor.

DETAILED DESCRIPTION OF THE INVENTION

Figure 1:
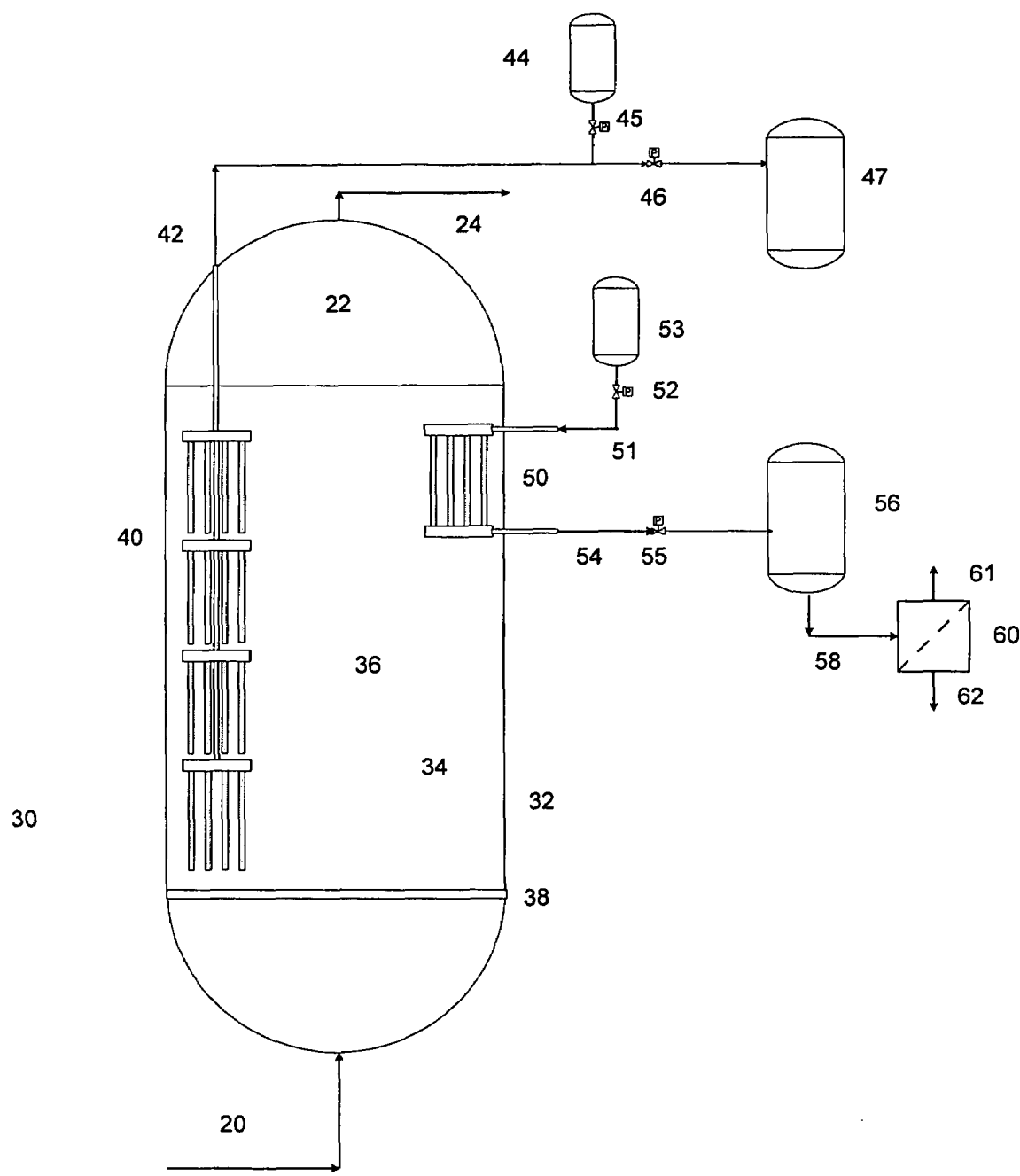

The present invention relates to a process and filter system for separating particulate solids from a liquid and is useful in a hydrocarbon synthesis (HCS) process. The action of the gas serves to mix the solids and the liquid, providing an efficient reaction system for the HCS process.

In a Fischer-Tropsch slurry HCS process, a syngas containing a mixture of $H_2$ and CO is bubbled up into a reactive slurry in which it is catalytically converted into hydrocarbons, preferably liquid hydrocarbons. The mole ratio of hydrogen to the carbon monoxide in the feed will range from about 0.5 to 4, but will more typically range from about 0.7 to 2.75 and preferably from about 0.7 to 2.5. The stoichiometric molar consumption ratio for a Fischer-Tropsch HCS reaction is typically about 2.1, but there are various reasons for using other than a stoichiometric ratio as is well known to those skilled in the art. Thus a discussion of such is unnecessary and beyond the scope of the present invention. The slurry liquid in the reactor comprises the hydrocarbon products produced by the hydrocarbon synthesis reaction, which are liquid at reaction conditions. A long standing problem has been the separation and removal of the hydrocarbon liquid product produced in the reactor from the relatively fine catalyst particles. The elevated temperature and pressure in the reactor and the waxy nature of the hydrocarbon products make conventional particulate separation and filtration methods unsuitable for use in a slurry type hydrocarbon synthesis process.

The temperature and pressure in the slurry reactor can vary widely depending on the particular catalyst used and the products desired. Typical conditions effective for forming hydrocarbons comprising mostly $C_5+$ paraffins, (e.g., $C_5$ to $C_{200}$), preferably $C_{10}+$ paraffins employing a supported cobalt catalyst include temperatures, pressures and hourly gas space velocities in the range of from about 320-600° F., 80-600 psi and 100-40,000 V/hr/V, expressed as standard volumes of the gaseous CO and $H_2$ mixture (0° C., 1 atm) per hour per volume of catalyst, respectively. The slurry typically contains from about 10 wt % to 70 wt % catalyst solids, more typically from about 30 wt % to about 60 wt % and in some embodiments about 40 wt % to about 55 wt % is preferred. As mentioned above, the slurry liquid comprises the hydrocarbon products that are preferably liquid at reaction conditions, along with minor amounts of other components.

While catalyst particle sizes may broadly range from as small as 1 to as large as 200 microns, typical slurry hydrocarbon synthesis catalysts will have a mean particle size of 20-100 microns. Such catalysts will also include fine particles smaller than 1 micron and the constant agitation and mixing of the catalyst particles in the slurry results catalyst attrition. The attrition process produces fines generally having a particle size less than about 10 microns. Moreover, a significant portion of the attrition products produced from normal operation of a Fischer-Tropsch slurry bubble column process will have particle sizes smaller than about 1 micron.

The filter system of the present invention comprises at least two filter sections, each comprised of a plurality of hollow filter elements disposed on a manifold connected to a filtrate conduit. At least one section is comprised of one or more filter elements having pores of less than about 10 microns, and at least one section is comprised of one or more filter elements having pores 10 microns or greater. In the process of this invention the filter system is immersed in the slurry wherein the interior of the filter elements, manifold or manifolds and conduit are all in fluid communication with each other. The filter elements are permeable to the slurry liquid, but not the particulate solids that each filter section is chosen to block. The filter system and process of the present invention are useful for separating and removing slurry hydrocarbon liquid from a three phase, Fischer-Tropsch type hydrocarbon synthesis slurry, either inside the slurry reactor or outside the reactor in a separate vessel.

In one embodiment of the present invention, each one or more sections of the filter system comprises a plurality of filter elements vertically disposed and horizontally arrayed, or arranged, across the horizontal surface of a respective manifold which is connected to a common filtrate conduit. The filter elements comprise elongated hollow tubes, or pipes, made of a liquid permeable material but impermeable to the passage of the solids for which they were designed. Such filter elements may be composed of, for example, sintered metal particles, sintered metal fibers, wound wedgewire, wire mesh, or any configuration that has narrow, uniform pore openings of the desired size. The material of construction of the filter elements may be any material of construction that is durable and that can withstand the temperatures and pressures of a Fischer-Tropsch reactor without premature failure. Preferred materials include the 300 series stainless steels. For example, it is preferred that the small pore filters composed of 316 stainless steel sintered metal particles and the large pore filters be composed of 316 stainless steel wedgewire or wire mesh materials.

In another preferred embodiment, the surface of the filter media that is exposed to the slurry environment is treated, or modified, to reduce its tendency for fouling, e.g., for fine particles to permanently stick and blind the filter surface. Non-limiting examples of such treatments include, coating with titania, zirconia, or ceramic materials; machining of the surface of the filter to reduce surface roughness; anodizing, nitriding, or other suitable chemical treatment that can have a beneficial effect on the filter surface.

In the subject invention, large pore and small pore filter sections are operated independently and serve distinct functions. The small pore filter has openings chosen to exclude all or substantially all of the particulates present in the slurry reactor, including fines produced by the attrition of the larger catalyst particles. The liquid product removed from the reactor through the small pore filters will hence be completely or substantially completely free of particulates. The large pore filter has openings chosen to exclude the larger catalyst particles but to allow the smaller catalyst fines to pass. The liquid product removed from the reactor through the large pore filters will contain the fines generated by the attrition of the catalyst. The amount of liquid withdrawn through the large pore filters will be a relatively small fraction of the total liquid withdrawn from the reactor, but sufficient in quantity to carry the fine particles. By relatively small fraction we mean between about 1 wt % to about 25 wt %, and preferably no more that about 1 wt % to about 15 wt % of the slurry will be filtered through the large pore filter elements. A most preferred range will be from about 1 wt % to about 5 wt % of hydrocarbon product passing through the large pore filter elements.

Referring now to the sole FIGURE hereof a slurry type hydrocarbon synthesis reactor 30 is shown as comprising a cylindrical steel outer shell or vessel 32, containing a three phase slurry 34 within, which comprises hydrocarbon liquid in which catalyst particles are dispersed and suspended, and which also contains gas bubbles. The gas comprises synthesis gas and gas products of the Fischer-Tropsch type hydrocarbon synthesis reactions. Synthesis feed gas is introduced into the reactor, via line 20 and is injected up into the bottom of the slurry 34, by means of a gas distributor 38. The synthesis gas flows up through the slurry 34 and is indicated by bubbles 36, of which merely a few are shown for convenience. The synthesis gas contacts the catalyst particles in the slurry and forms liquid and gas hydrocarbon products, along with significant amounts of water vapor. Two filter assemblies of the invention, 40 and 50, are shown suspended in slurry 34, each comprising one or more groupings of filter elements. Each grouping contains multiples of filter elements of which only a few are briefly illustrated for the sake of convenience. Filter assembly 40 is composed entirely of small pore filter elements while filter assembly 50 is composed entirely of large pore filter elements. The small pore filter elements will have a mean pore size less than about 10 microns, preferably less than about 5 microns, and more preferably less than about 2 microns. The mean pore size can be determined using ASTM test E 1294 or equivalent. The large pore filter elements will have a mean pore size of 10 microns or greater. Although both the large and small pore filter elements can be positioned at any location within the slurry, it is preferred that the large pore filter elements be position in the top half, more preferably in the top ⅓ of the slurry.

As the reaction proceeds, the vapor phase products and unreacted synthesis gas exit at the top of the slurry and pass overhead into a gas disengaging zone 22 from where they are removed from the reactor via line 24. At the same time, the liquid phase products pass into the interior of the small pore filter elements whose walls are porous and pervious to the flow of the slurry liquid, but which will not allow passage of the catalyst particles or catalyst fines in the slurry into the interior of the filter elements, due to the extremely small size (e.g., <2 microns) of the pores. The pore size is catalyst specific and a mean pore size of <2 microns has been found adequate for a catalyst comprising Co supported or composited with titania. The slurry liquid passes into the interior of the filter elements as a filtrate and then into the interior of the manifolds with which the filter elements are in fluid communication. The filtrate passes from the manifolds into the filtrate conduits and is removed from the reactor as indicated by arrow 42 into clean product receiver 47.

A small portion of the liquid phase product from slurry 34 is withdrawn from the reactor through large pore filter assembly 50. Withdrawal can be continuous or periodic. The slurry liquid containing fine particles passes into the interior of the filter elements as a filtrate and then into the interior of the manifolds with which the filter elements are in fluid communication. The filtrate passes from the manifolds into the filtrate conduits and is removed from the reactor as indicated by arrow 54 into dirty product receiver 56. The liquid and fines from receiver 56 may be further processed in separation device 60 producing a clean product stream 62 and a solids rich stream 61. Separation device 60 can be any suitable separation device including a filter, a hydrocyclone, a centrifuge, a gravity settler, and the like.

Periodic backwashing of the small pore filter elements in the slurry is necessary to clean the filter elements and reduce resistance to flow. The small pore filters are backwashed in the following manner. Product valve 46 is first closed, stopping the flow of liquid product through the filter. Optionally, a short period of time may be chosen where the no-flow condition is held. Next, the backwash valve 45 is opened for a period of time, allowing backwash fluid from backwash drum 44 to flow into the conduit 42 and through the filters 40 into the reactor in a direction opposite to normal flow. To accomplish this, backwash drum 44 is operated at a pressure higher than the reactor pressure. Those skilled in the art can select the amount of overpressure in the backwash drum and timing of the backwash valve opening to maximize the beneficial effects of the backwash. It is generally known that a high overpressure and a short valve opening duration, giving a sharp pressure pulse to the filter, will provide a good backwash. After the backwash, valve 45 is closed again. Optionally, a short period of time again may be chosen where the no-flow condition is held. Finally, the product valve 46 is opened and flow is re-established to the product collection drum 47.

Periodic backwashing of the large pore filter is also necessary to prevent filter cake buildup and maintain the fines removal capability of the filter. The large pore filters are backwashed in the following manner: Product valve 55 is first closed, stopping the flow of fines and liquid through the filter. Optionally, valve 55 may be left open for a short period of time after the backwash valve 52 is opened to flush any solids from the interior of the filters into the dirty product receiver. Next, the backwash valve 52 is opened for a period of time, allowing backwash fluid from backwash drum 53 to flow into the conduit 51 and through the filters 50 into the reactor in a direction opposite to normal flow. To accomplish this, backwash drum 53 is operated at a pressure higher than the reactor pressure. Those skilled in the art can select the amount of overpressure in the backwash drum and timing of the backwash valve opening to maximize the beneficial effects of the backwash. It is generally known that a high overpressure and a short valve opening duration, giving a sharp pressure pulse to the filter, will provide a good backwash. After the backwash, valve 52 is closed again. Optionally, a short period of time again may be chosen where the no-flow condition is held. Finally, the product valve 55 is opened and flow is reestablished to the dirty product collection drum 56.

It may be advantageous to connect the backwash and product collection manifolds for the large pore filter in a particular fashion, as illustrated in the FIGURE hereof. The product manifold is set at the bottom of the vertically arranged filters. Any solids will tend to settle towards the bottom manifold and can easily be removed. The backflush manifold is set into the top of the filters and clean backwash can be used to sweep any solids out of the interior of the filter into the dirty product drum prior to the actual backwash cycle. It may be necessary to install a high point vent on the upper manifold to periodically vent any buildup of vapor from the manifold.

In an HCS process, liquid and gaseous hydrocarbon products are formed by contacting a syngas containing a mixture of $H_2$ and CO, under shifting or non-shifting conditions and preferably under non-shifting conditions in which little or no water gas shift reaction occurs, particularly when the catalytic metal comprises Co, Ru or mixture thereof. Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

The hydrocarbons produced by an HCS process according to the invention are typically upgraded to more valuable products, by subjecting all or a portion of the $C_5+$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A slurry hydrocarbon synthesis process for forming hydrocarbons, at least a portion of which are liquid, the invention comprises:
   (a) reacting a synthesis gas containing a mixture of $H_2$ and CO in the presence of a solid, particulate hydrocarbon synthesis catalyst in a slurry in a hydrocarbon synthesis reactor at reaction conditions effective to form hydrocarbons, at least a portion of which are liquid at said reaction conditions, wherein said slurry comprises said catalyst and gas bubbles in a hydrocarbon slurry liquid, and wherein said slurry hydrocarbon liquid comprises said liquid hydrocarbons;
   (b) contacting said slurry with a filter system comprised of one or more small pore filter elements having a mean pore size less than about 10 microns, and one or more large pore filter elements having a mean pore size 10 microns or greater; said small pore filter elements arrayed across a manifold connected to a filtrate conduit, with the interior of the elements, manifold and conduit in fluid communication with each other, and wherein the wall separating the interior of the elements from the slurry is permeable to said slurry hydrocarbon liquid but not said slurry solids; and said large pore filter elements arrayed across a separate manifold from said small pore filter elements and connected to a separate filtrate conduit, with the interior of the elements, manifold and conduit in fluid communication with each other, and wherein the wall separating the interior of the elements from the slurry is permeable to said slurry hydrocarbon liquid and particles less than about 10 microns, and wherein said larger pore filter elements are such that no more than about 1 wt % to about 25 wt % of slurry liquid is passed there-through;
   (c) passing said slurry hydrocarbon liquid through said small pore filter element walls and into said interior of said elements as a filtrate and then successively passing said filtrate through the interior of said manifold and said filtrate conduit and passing said filtrate from said conduit out of said reactor whereby said filtrate is substantially free of solids; and
   (d) passing said slurry hydrocarbon liquid and fines through said large pore filter element walls and into said interior of said elements as a filtrate and then successively passing said filtrate through the interior of said manifold and said filtrate conduit passing said filtrate from said conduit out of said reactor whereby the concentration of fines in the reactor is controlled.

2. The process as claimed in claim 1, wherein the catalyst is an iron-based or a cobalt based Fisher-Tropsch catalyst.

3. The process as claimed in claim 2, wherein the catalyst is a cobalt based catalyst with a mean particle size in the range of 20 microns to 100 microns.

4. The process of claim 1 wherein both the large pore and small pore filter elements are backflushed periodically to maintain the surface of the filter free of cake.

5. The process of claim 4 wherein the backwash consists of one or more short duration, high pressure pulses of clean fluid flowing in the opposite direction of normal product flow out of the reactor.

6. The process of claim 5 wherein the backwash step is preceded by a flushing step to clear the internal filter volume of any residual fine particles.

7. The process of claim 5 wherein the backwash step is followed by a period of no flow through the filters, then the filters are returned to service using a gradual opening of the product withdrawal valves.

8. The process of claim 1 wherein the large pore filter elements are located inside the slurry reactor vessel.

9. The process of claim 1 wherein the large pore filters are located outside the slurry reactor vessel but in communication with the reactor slurry.

10. The process of claim 1 wherein the small pore filter elements are backflushed periodically to maintain the surface of the filter free of cake.

11. The process of claim 10 wherein the backwash for the small pore filter elements comprises one or more short duration, high pressure pulses of clean fluid flowing in the opposite direction of normal product flow out of the reactor.

12. The process of claim 11 wherein the backwash step is followed by a period of no flow through the filters, then the filters are returned to service using a gradual opening of the product withdrawal valves.

13. The process of claim 1 wherein the small pore filters are located inside the slurry reactor vessel.

14. The process of claim 1 wherein the small pore filters are located outside the slurry reactor vessel but in communication with the reactor slurry.

* * * * *